US008625567B2

(12) United States Patent
Sim et al.

(10) Patent No.: US 8,625,567 B2
(45) Date of Patent: Jan. 7, 2014

(54) METHOD FOR OPENING CHANNEL WHICH IS USED IN RADIO COMMUNICATION DEVICE AND RADIO COMMUNICATION SYSTEM

(75) Inventors: Hong Cheng Michael Sim, Singapore (SG); Taisuke Matsumoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 12/993,406

(22) PCT Filed: May 26, 2009

(86) PCT No.: PCT/JP2009/002316
§ 371 (c)(1),
(2), (4) Date: Nov. 18, 2010

(87) PCT Pub. No.: WO2009/144921
PCT Pub. Date: Dec. 3, 2009

(65) Prior Publication Data
US 2011/0069697 A1    Mar. 24, 2011

(30) Foreign Application Priority Data
May 26, 2008    (JP) .................................. 2008-136910

(51) Int. Cl.
*H04W 4/00*    (2009.01)
(52) U.S. Cl.
USPC ............................ 370/341; 370/431; 370/437
(58) Field of Classification Search
USPC .................. 370/310–350, 431–437, 441–444
See application file for complete search history.

(56) References Cited

U.S. PATENT DOCUMENTS

| 6,888,819 | B1 | 5/2005 | Mushkin |
| 7,158,758 | B2 | 1/2007 | Lim |
| 8,254,336 | B1 * | 8/2012 | Benveniste .................... 370/332 |
| 2002/0154617 | A1 | 10/2002 | Hirano |

(Continued)

FOREIGN PATENT DOCUMENTS

| JP | 2002-152232 | 5/2002 |
| JP | 2002-152233 | 5/2002 |

OTHER PUBLICATIONS

International Search Report dated Jul. 14, 2009.

(Continued)

*Primary Examiner* — Andrew Chriss
*Assistant Examiner* — Kenan Cehic
(74) *Attorney, Agent, or Firm* — Dickinson Wright PLLC

(57) ABSTRACT

In radio communication, especially in a centralized network, a commonly faced problem is the issue of the coexistence between a plurality of networks and different networks use different network timing parameters with no synchronization to one another. Thus, a device of one network usually has a difficulty in communication with a device of another network whether or not both are in a radio communication range. This results in causing unwanted mutual interference because when two or more networks operate in the same operation space, a device belonging to a certain network has a difficulty in letting a device belonging to another network know about the existence of the device belonging to the certain network. A means for enabling the first device to communicate with the second device is presented and the operation in the current channel is stopped and the current channel in operation is opened with respect to the second device and the other devices in the network of the second device by the established communication means.

5 Claims, 18 Drawing Sheets

(56) References Cited

U.S. PATENT DOCUMENTS

| | | |
|---|---|---|
| 2002/0156907 A1 | 10/2002 | Hirano |
| 2004/0157580 A1* | 8/2004 | Stadelmeier et al. .......... 455/338 |
| 2004/0185861 A1* | 9/2004 | Domon et al. ................. 455/450 |
| 2005/0089001 A1* | 4/2005 | Nishikawa .................... 370/338 |
| 2006/0014536 A1* | 1/2006 | Demirhan et al. ............. 455/434 |
| 2006/0178151 A1* | 8/2006 | Lappetelainen et al. ....... 455/450 |
| 2007/0117517 A1* | 5/2007 | Hui et al. ..................... 455/67.11 |
| 2007/0153817 A1* | 7/2007 | Osann ........................... 370/406 |
| 2009/0253421 A1* | 10/2009 | Camp et al. ................... 455/418 |

OTHER PUBLICATIONS

ECMA-368, "High Rate Ultra Wideband PHY and MAC Standard," 3rd Edition, Dec. 2008, pp. 3 unmarked, i-viii, 1-330, p. 4, Line 7.

"Part 15.3: Wireless Medium Access Control (MAC) and Physical Layer (PHY) Specifications for High Rate Wireless Personal Area Networks (WPANs)," IEEE Std 802.15,3, Sep. 2003, pp. cover page, i-viii, 1-315, p. 4, Line 6.

* cited by examiner

METHOD FOR OPENING CHANNEL WHICH IS USED IN RADIO COMMUNICATION DEVICE AND RADIO COMMUNICATION SYSTEM

TECHNICAL FIELD

The present invention relates to radio communication. More particularly, the present invention relates to a method and a radio communication system for channel vacation used in radio communication devices.

BACKGROUND ART

In wireless communication, there are two main types of networks, namely "centralized network" and "distributed network".

In centralized networks, channel time is controlled by a particular control device, commonly called "master device". Besides the master device, other devices that rely on the master device for network control are commonly called "slave devices". There are many forms of this centralized network.

Some centralized networks may have a configuration including only one slave device. This kind of network is sometimes called "point-to-point network," "master/slave pair," or "master/slave network." In other forms of centralized network, there may be two or more slave devices connecting to the master device.

This kind of network where there is one master device and two or more slave devices is sometimes called "star-topology network". FIG. 1 illustrates a typical centralized network with one master device (101) and three slave devices (102), (103) and (104). A Dotted circle (111) represents the area coverage of the network formed by the master device (101). Lines (122), (123) and (124) represent communication and connection links between the slave devices (102), (103) and (104) with the master device (101), respectively.

In a centralized network, only the master device transmits "poll frames" in a periodic manner. Although "poll frame" is sometimes called "beacon frame", it is referred to here consistently as "poll frame". A poll frame is a special frame transmitted by a master device, generally for the following purposes:

Allow other devices to discover the master device;
Provide a means to synchronize timing information with the master device, to other devices; and
Provide a means to announce network-related information, to the master device.

Slave devices generally do not need to transmit poll frames. Instead, slave devices listen for a poll frame from the master device to keep time synchronization and to determine whether the slave devices are allowed to perform transmission. Slave devices generally transmit only commands, data or acknowledgement frames.

A general timing configuration in a communication channel for a centralized network is shown in FIG. 2. The channel time is usually used for transmission of a poll frame (201) by a master device and for a command frame (210) and a data frame (211) by either the master device or slave devices. An acknowledgement frame may be transmitted as well, if necessary.

Non-Patent Literature 1 discloses an example of a centralized network.

On the other hand, in a distributed network, instead of having a single master device to control channel time access as the case of a centralized network, every device controls channel time access in a distributed manner. There is no "master" and "slave" concept because every device can be regarded as an independent "master" itself. Generally, every device in a distributed network transmits poll frames for the following purposes:

Discover an opponent's device one another;
Provide a means to synchronize timing information with itself, to other devices;
Provide a means to announce network related information, to itself; and
Provide a means to avoid and detect transmission interference in a distributed scheme, to itself.

FIG. 3 illustrates a network topology of a typical distributed network composed of four devices (301), (302), (303) and (304). The network coverage (range) reachable by each of these devices is shown by dotted circles (311), (312), (313) and (314). Each of lines (321), (322), (323), and (324) shows the communication link between two devices.

A general timing structure in a communication channel for a distributed network is shown in FIG. 4. The channel time is usually used for transmission of poll frames (401), (402), (403) and (404) of all devices and for a command frame (410) and a data frame (411) by any devices. Optionally, an acknowledgement frame may be transmitted as well.

Non-Patent Literature 2 discloses an example of a distributed network.

CITATION LIST

Non-Patent Literature

[NPL 1] IEEE 802.15.3 High Rate Wireless Personal Area Network Standard
[NPL 2] ECMA-368 High Rate Ultra Wideband PHY and MAC Standard

SUMMARY OF INVENTION

Technical Problem

Comparing channel time usage by a distributed network (FIG. 4) with that of a centralized network (FIG. 2), it is possible to more efficiently use channel time for data transmission by a centralized network than a distributed network because there is only one device (i.e. master device) to transmit poll frames in a centralized network.

Generally, although a distributed network shows higher performance assuming devices having high mobility nature, a distributed network becomes more complex in its configuration because all devices need to control and coordinate channel time access in a distributed manner. By contrast with this, a centralized network is able to have simpler configuration and realize good system throughput. Therefore, a centralized network is more preferable than a distributed network.

However, a centralized network has the following problems. One is coexistence with other master devices. In a centralized network, it is assumed that there is only one master device that controls channel time access. However, it is sometime possible that a second master device operates in the vicinity of the existing first master device. In this case, the networks formed by both master devices are highly likely to interfere with one another. This causes data transmission to be difficult, or to fail in the worst case.

FIG. 5 shows a situation in which a second master device appears in the vicinity of the existing first master device. In this figure, a centralized network (511) is first formed by a master device (501), and a slave device (502) makes a connection (522) with the master device (501) to start communication. After that, a second master device (503) appears in the network (511) (either due to mobility, changing environmental conditions, or due to the second master device (503) being switched on by a user).

The second master device (503) listens during the channel time, receives a poll frame transmitted from the first master device (501) and detects the first master device (501). At this time, the second master device (503) encounters two problems.

The first problem is that the second master device (503) has to announce its presence to the detected first master device (501). Since there is no definition of communication steps between master-to-master devices in a centralized network in general, it is difficult for the second master device (503) to communicate with the first master device (501).

The second problem is that there is no means for the second master device (503) to request the first master device (501) to vacate the current channel if the second master device (503) determines that its network is of higher priority and needs the entire channel time.

Currently, in protocols such as IEEE 802.15.3, the first problem can be solved by firstly connecting the second master device (503) to the first master device (501) in order to communicate with the first master device (501).

In addition, after that, the second master device (503) can request the first master device (501) for part of the channel time to form its own network (either as "child" or "neighbor" network in IEEE 802.15.3 context). In other words, it is possible to solve the second problem by vacating the channel for existing the first master device (501).

FIG. 6 shows a situation in which the second master device appears in the vicinity of the slave device. In this figure, a centralized network (611) is first formed by a master device (601) and a slave device (602) makes a connection (622) with the master device (601) to start communication. After that, the second master device (603) appears outside the network (611) near the slave device (602).

The second master device (603) listens for the channel time and is not able to receive any poll frame from the first master device (601), and therefore is not able to find out any information about the network (611) (that is, it does not know when a poll frame is transmitted, when CEP (command exchange period) starts, and so forth).

However, the second master device (603) manages to detect the slave device (602) by receiving a command, data or acknowledgement frame transmitted from the slave device (602) to the first master device (601).

Similar to the case shown in FIG. 5, the second master device (603) encounters two problems that: (i) it has to communicate with the detected slave device (602) to announce its presence, and (ii) it has to command the detected slave device (602) to vacate the current channel.

The second master device (603) is not able to receive a poll frame from the first master device (601), and therefore knows nothing about the network configuration in term of the channel timing structure, so that problem (i) shown in FIG. 6 becomes more difficult. Therefore, there is no means for the second master device (603) to communicate with the slave device (602).

In IEEE 802.15.3 standards, there is no solution to this problem, and it is recommended that the second master device (603) may either (i) continue staying in the current channel to set up its own network, tolerating a certain level of interference, or (ii) search for another free channel and switch to that channel to set up its own network.

There is no way for the second master device (603) to communicate with the slave device (602), and this also means that there is no way for the second master device (603) to request the slave device (602) to vacate the current channel. Therefore, there is no solution to problem (ii).

As for the problems shown in FIG. 6, it is assumed that all devices use omni-directional antennas. A second scenario is also possible where all devices uses directional antennas. When using a directional antenna, the transmission range of a device does not broaden outward in all directions. Instead, the transmission energy has a certain width and propagates toward a certain direction. Similarly, signal reception is also limited towards a certain direction with a certain width.

FIG. 7 shows a situation in which the second master device appears in the vicinity of the existing first master device using a directional antenna. In this figure, a centralized network (711) is first formed by a master device (701) and a slave device (702) makes the connection (722) with the master device (701) using a transmission range (712) to start communication.

After that, a second master device (703) appears outside the transmission range (711) of the first master device (701), but in the transmission range (712) of the slave device (702).

Like the case shown in FIG. 6, the second master device (703) is not able to receive a poll frame transmitted from the first master device (701), but is able to detect the slave device (702) by receiving a command, data or acknowledgement frame transmitted from the slave device (702) to the first master device (701).

Therefore, in this case shown in FIG. 7, the second master device (703) encounters the same problem as in the case shown in FIG. 6.

It is therefore an object of the present invention to provide a method and a radio communication system for channel vacation used in radio communication devices, which allow a master device with a higher priority to efficiently use channel time in a centralized network.

Solution to Problem

The method according to the present invention is a method for channel vacation used in radio communication devices including: periodically transmitting timing synchronization information of a first network, from a first radio communication device serving as a control device in a first network; embedding, by a second radio communication device controlled by the first radio communication device, the timing synchronization information transmitted from the first radio communication device in a frame allowed to be transmitted; identifying, by a third radio communication device in a second network different from the first network, the first network based on the timing synchronization information transmitted from the second radio communication device to determine a period of time in which a command frame is allowed to be transmitted in the second network; and giving notice, from the third radio communication device in the second network, to the first radio communication device and the second radio communication device in the first network to vacate a current radio channel, based on the determined period of time.

The radio communication system according to the present invention adopts a configuration to include: a first radio communication device that is a control device in a first network and periodically transmits timing synchronization information of the first network; a second radio communication device that is controlled by the first radio communication device and transmits the timing synchronization information transmitted from the first radio communication device, being embedded in a frame allowed to be transmitted; and in a second network different from the first network, a third radio communication device that identifies the first network and determines a period of time in which a command frame is allowed to be transmitted in the second network, based on the timing synchronization information transmitted from the second radio communication device, and gives notice to the first radio communication device and the second radio communication device in the first network to vacate a current radio channel, based on the determined period of time.

Advantageous Effects of Invention

According to the present invention, a master device with a higher priority can efficiently use channel time in a centralized network.

DESCRIPTION OF EMBODIMENTS

Now, embodiments of the present invention will be described in detail with reference to the accompanying drawings.

Figure 1:
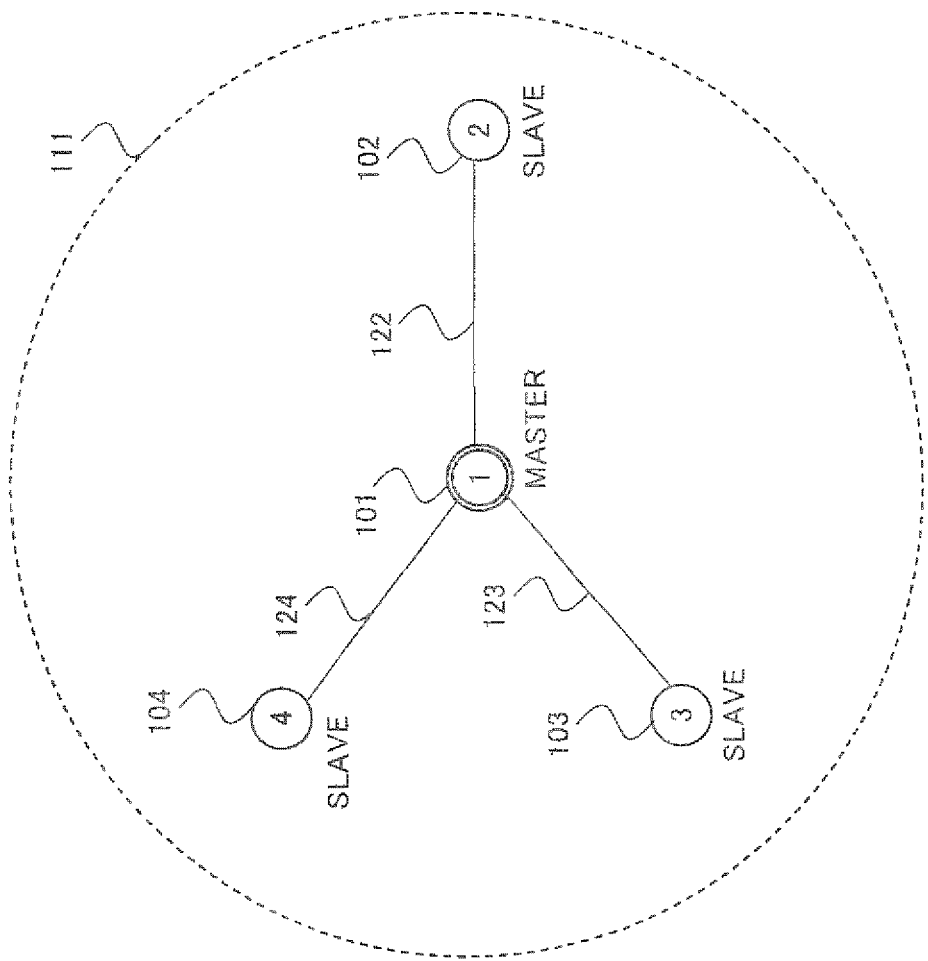
FIG. 1 is a drawing showing a centralized network having one master device and three slave devices.
Figure 2:
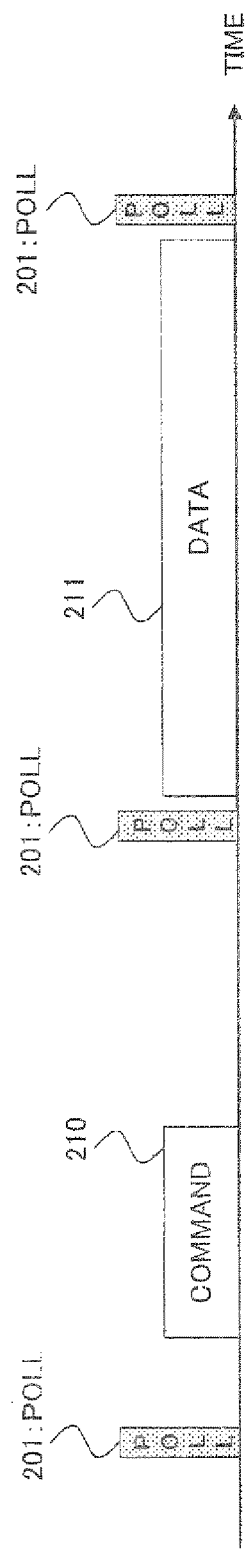
FIG. 2 is a drawing showing a timing structure of a centralized network.
Figure 3:
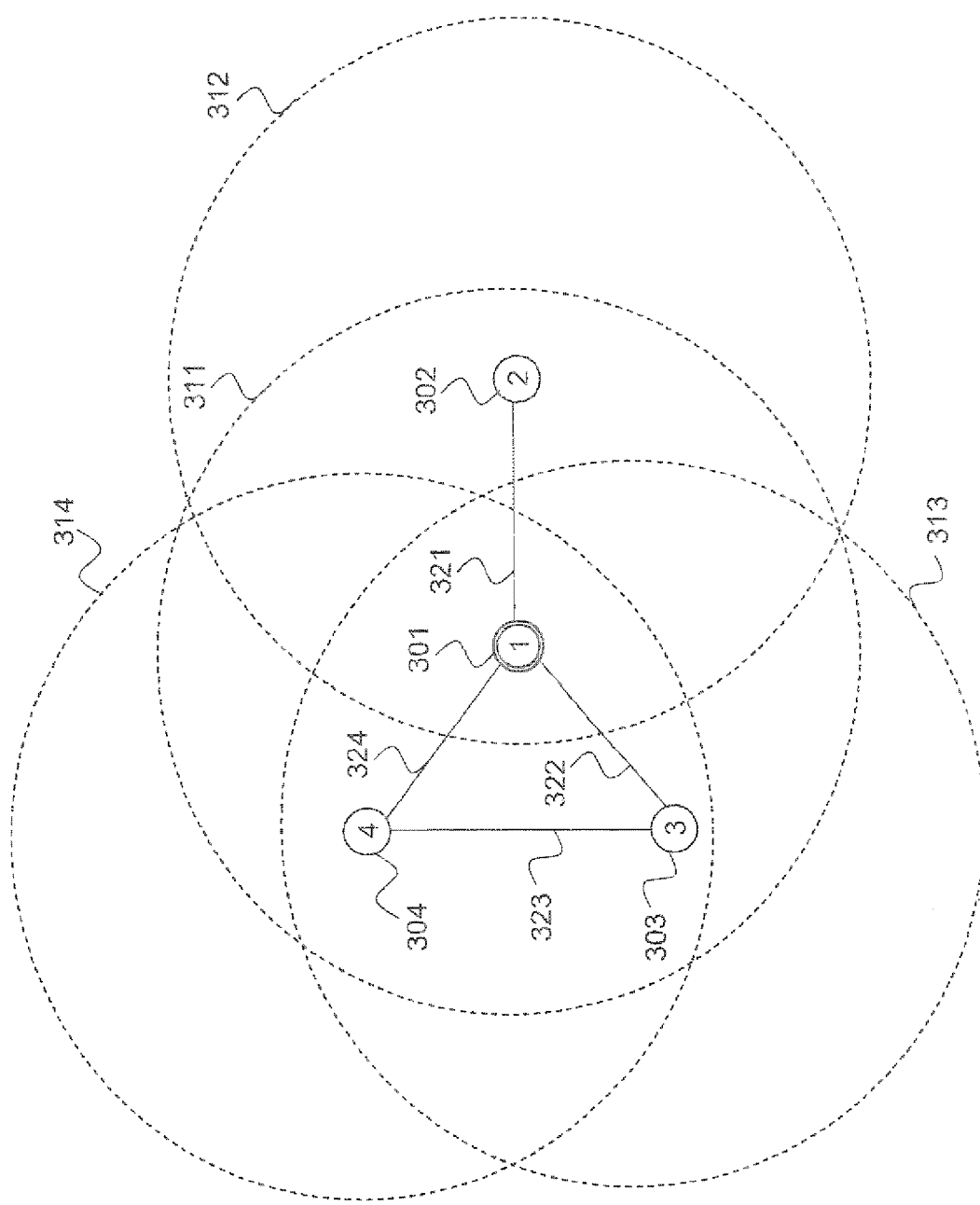
FIG. 3 is a drawing showing a distributed network having four devices.
Figure 4:
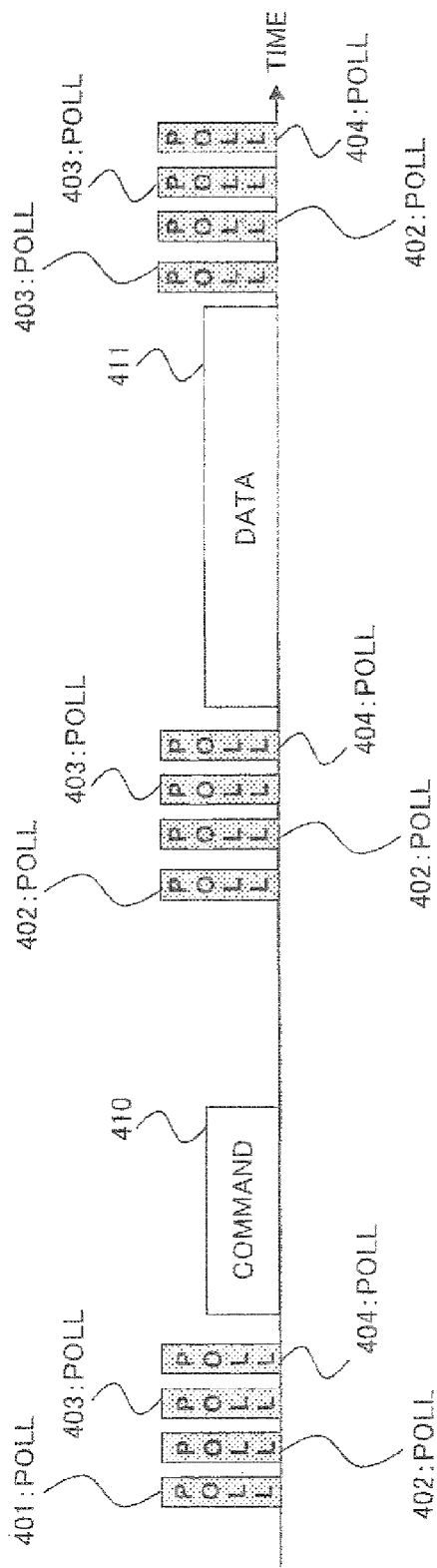
FIG. 4 is a drawing showing a timing structure of a distributed network.
Figure 5:
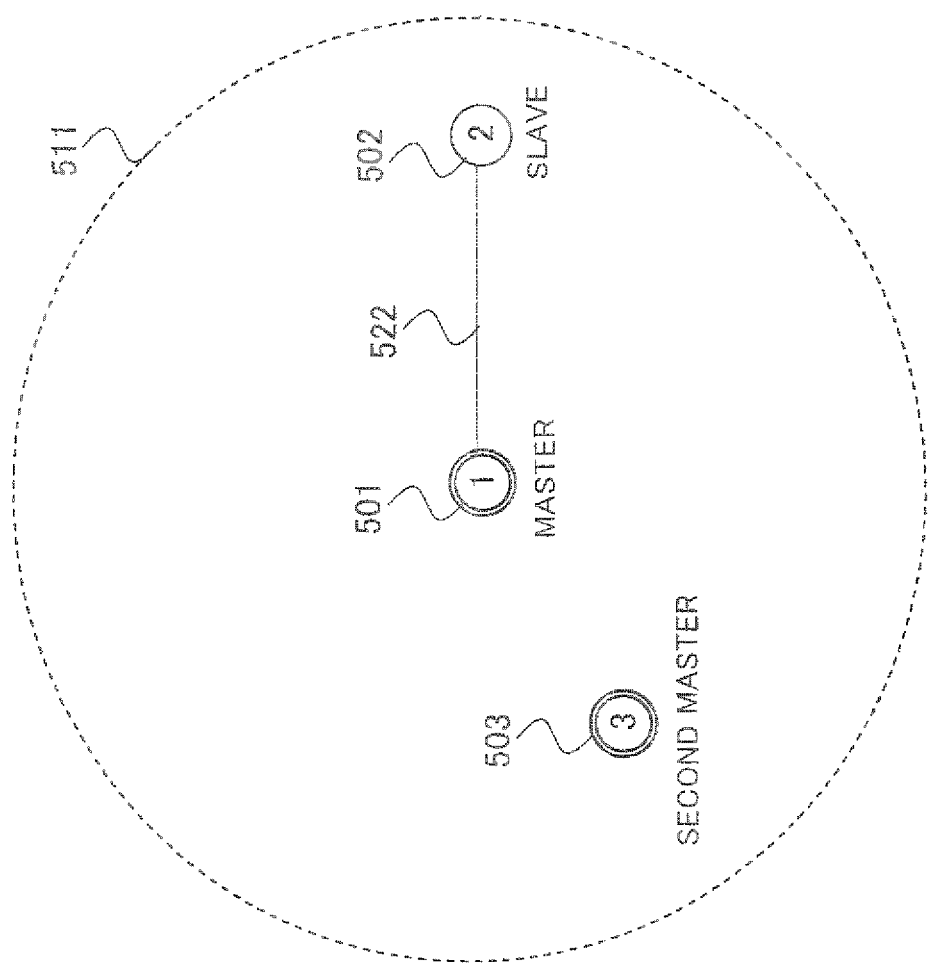
FIG. 5 is a drawing showing a second master device appearing in the vicinity of the existing first master device.
Figure 6:
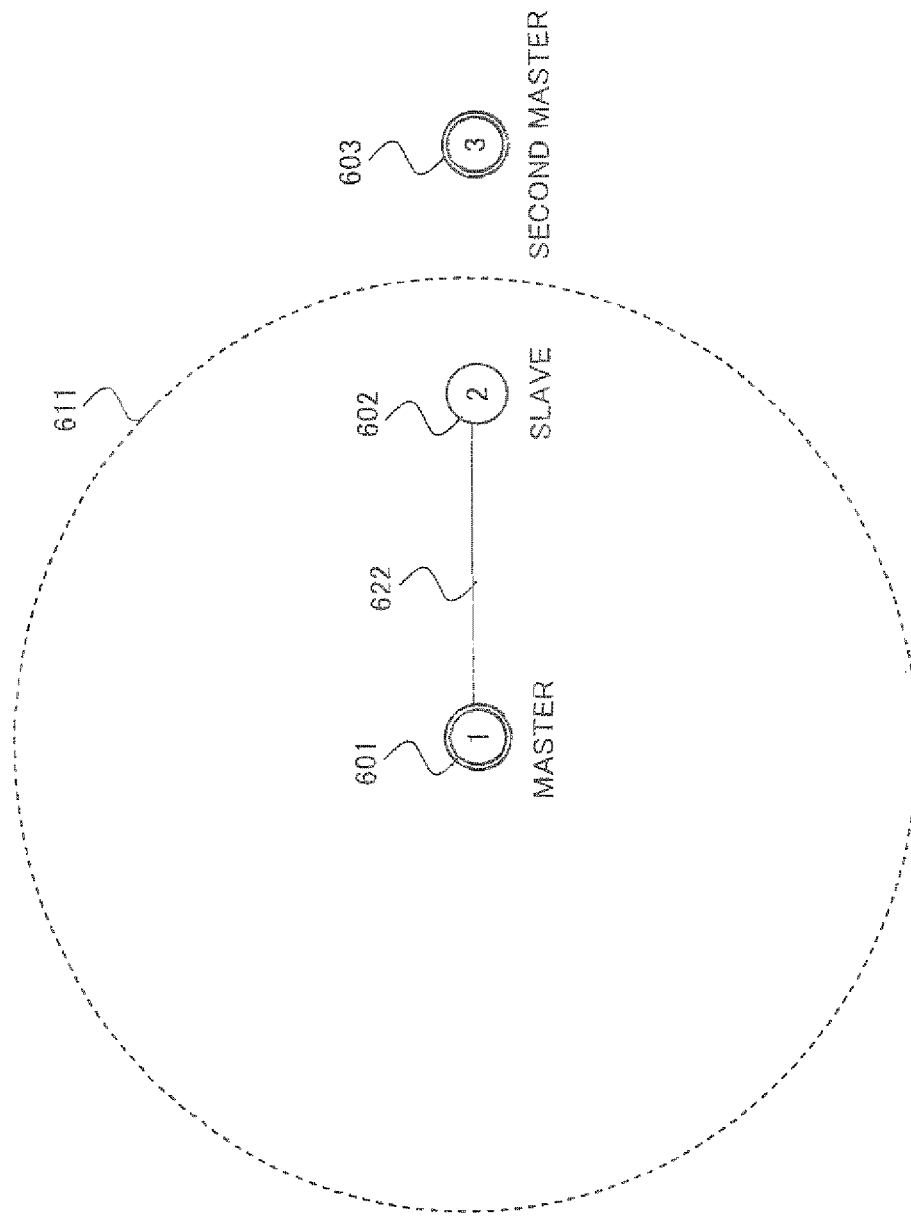
FIG. 6 is a drawing showing a second master device appearing in the vicinity of a slave device.
Figure 7:
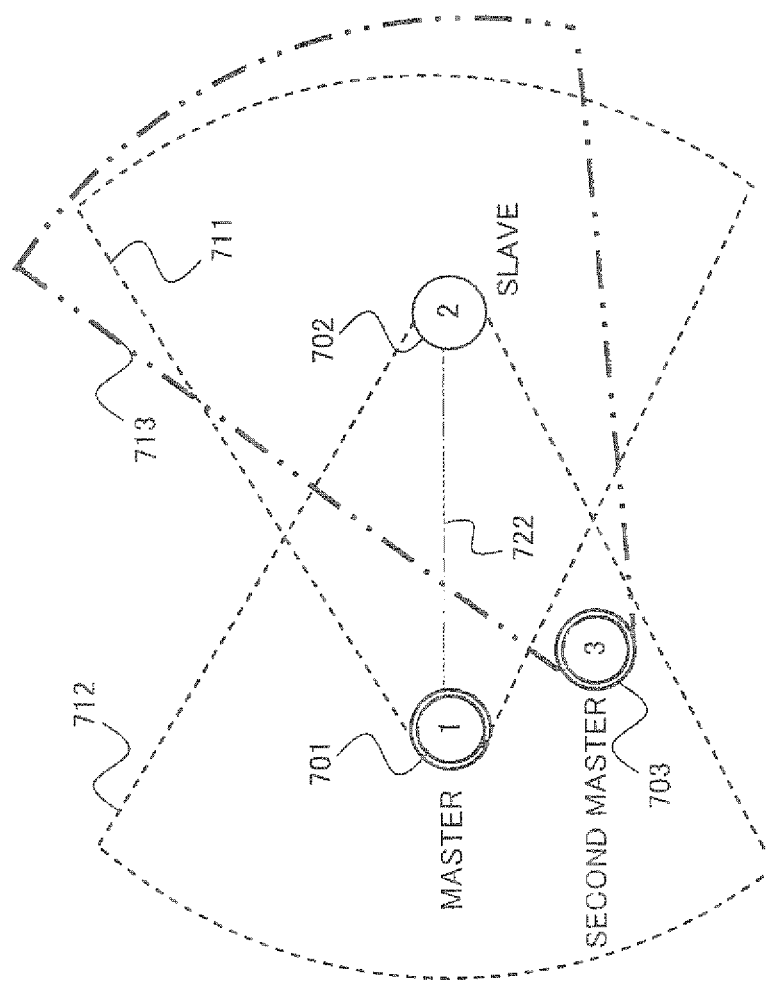
FIG. 7 is a drawing showing a second master device appearing in the vicinity of the existing first master using a directional antenna.
Figure 8:
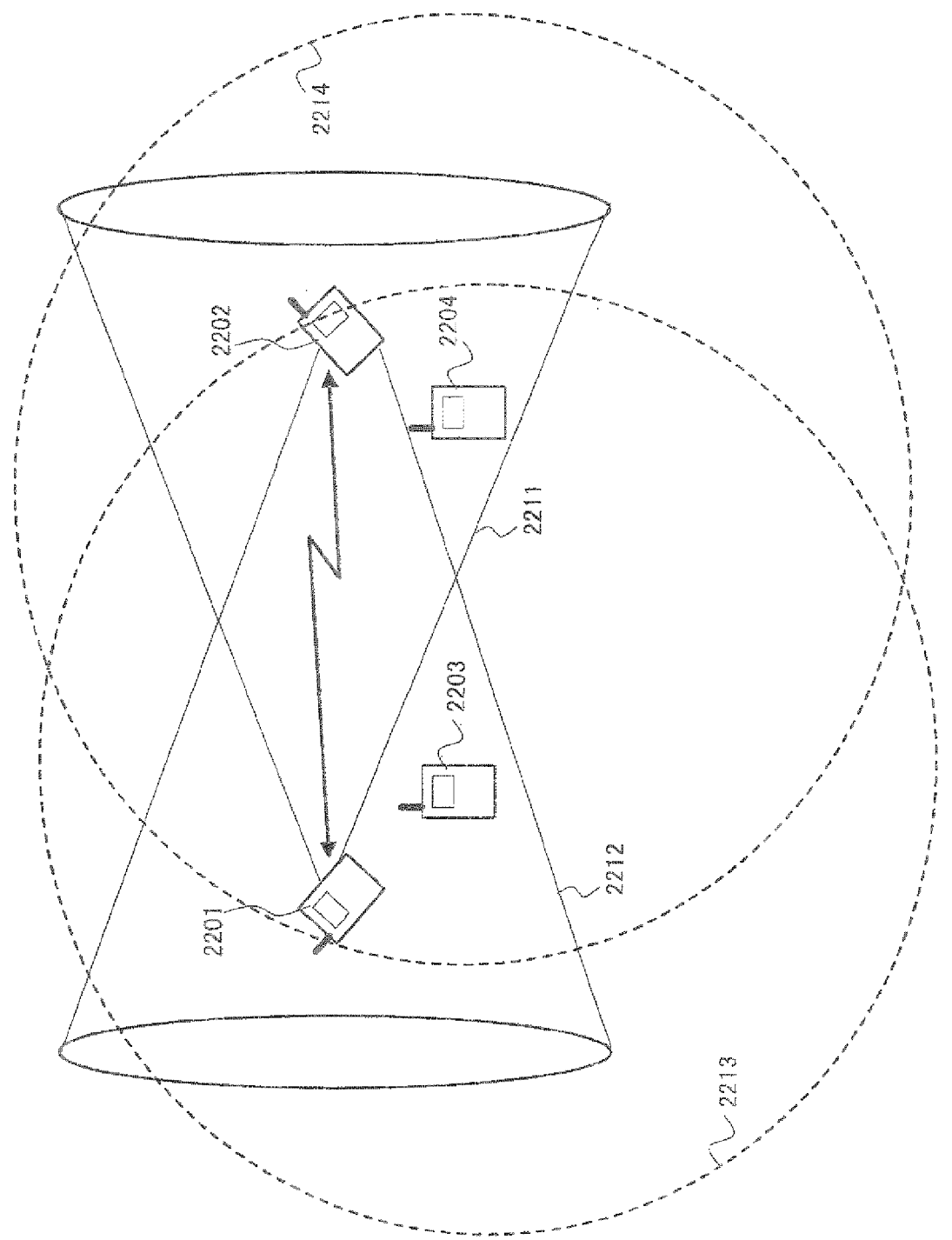
FIG. 8 is a drawing showing an example of a scenario of having a master device and a slave device each using a directional antenna, and third and fourth devices each using an omni-directional antenna in a certain network.

FIG. 8 shows a situation in which a first master device (2201) and a slave device (2202) are connected. The master device (2201) and the slave device (2202) use directional antennas and their transmission directions or ranges are represented by (2211) and (2212), respectively. Here, assume that a third device (2203) having an omni-directional antenna appears, with transmission range represented by (2213). In this case, the third device (2203) can detect only the slave device (2202) and wishes to make the slave device (2202) vacate the channel.

In addition, assume that a fourth device (2204) having an omni-directional antenna appears, with transmission range represented by (2214). In this case, the fourth device (2204) can detect only the master device (2201) and wishes to make the master device (2201) vacate the channel.

Figure 9:
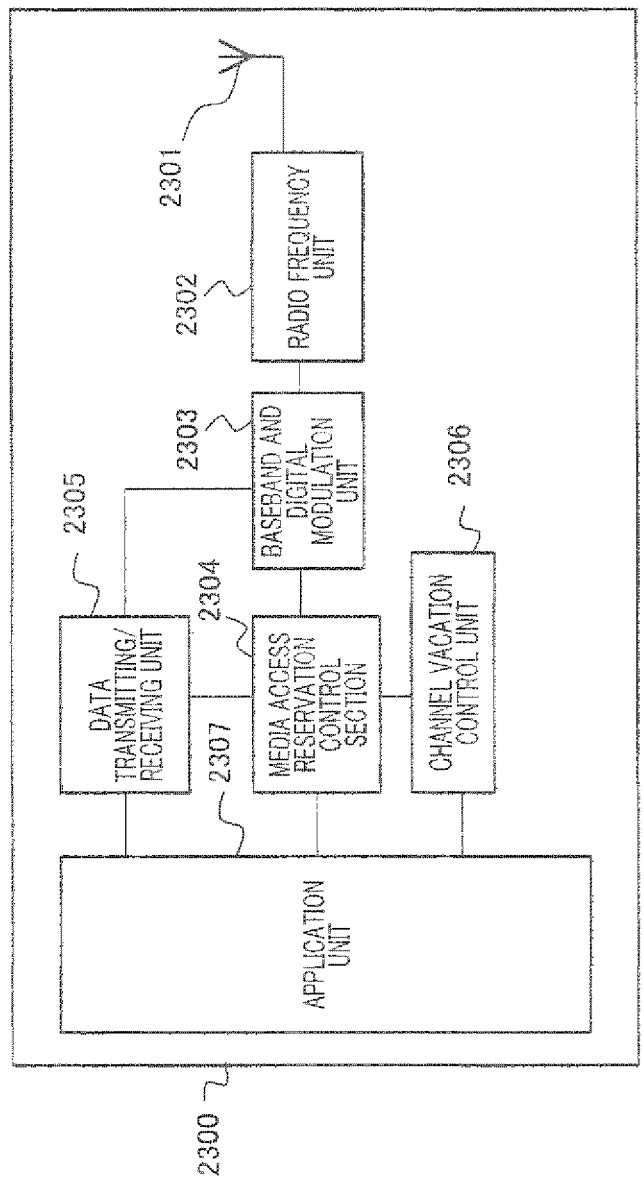
FIG. 9 is a drawing showing the internal configuration of a radio communication device used in an embodiment.

FIG. 9 shows the internal configuration of a radio communication device used in this embodiment. According to this figure, a device (2300) has a radio communication antenna (2301). In the present embodiment, a set of antennas is used. However, it may be possible to have two or more sets of antennas that are able to achieve both directional beam-forming and omni-directional transmission, and the present invention is equally applicable to this implementation.

A radio frequency unit (2302) is used to control radio frequencies used for radio transmission. There is also a baseband and digital modulation unit (2303) to perform modulation/demodulation as well as coding/decoding of transmission and reception messages. A medium access reservation control section (2304) controls how radio channel time is accessed and shared.

A channel vacation control unit (2306) controls how devices can make channel vacation request and respond to channel vacation request from other devices. A data transmitting/receiving unit (2305) performs peer-to-peer data message exchange using medium access time reserved by the medium access reservation control section (2304).

Finally, there is a application unit (2307) to execute one or a plurality of applications that use radio communication means provided by the data transmitting/receiving unit (2305), the medium access reservation control section (2304), and the channel vacation control unit (2306).

Figure 10:
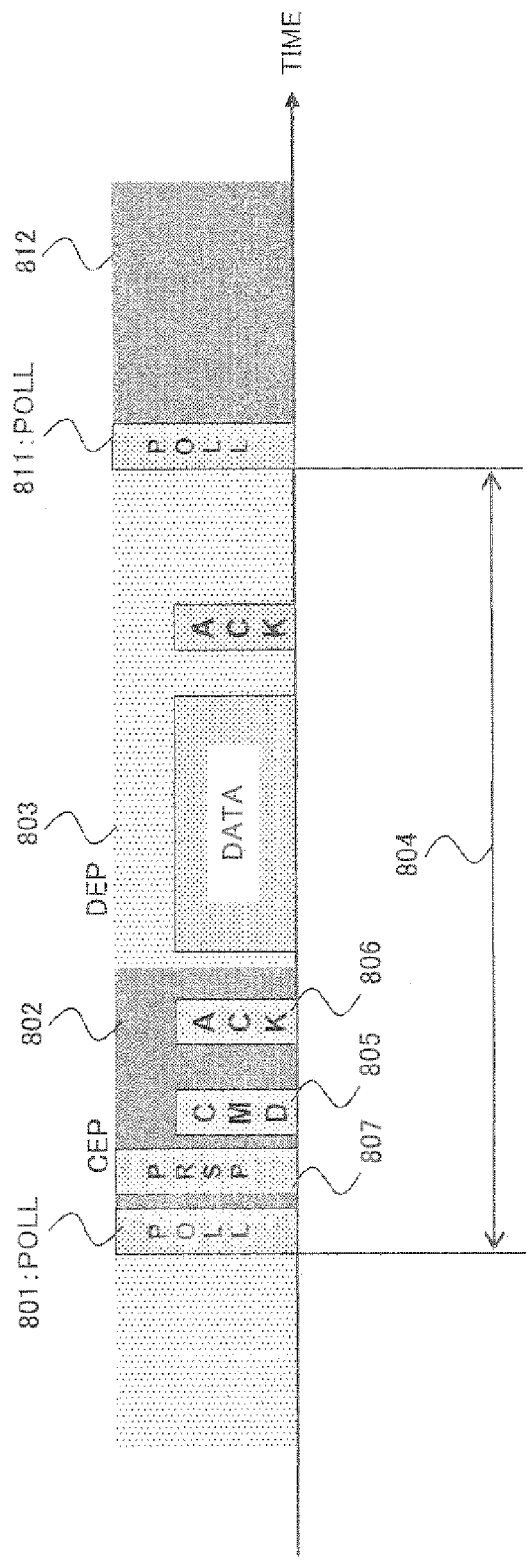
FIG. 10 is a drawing showing a timing structure in a network period used in a centralized network.

To explain the present invention, first, assume that the centralized network according to the present invention uses a basic channel time structure as shown in FIG. 10. In addition, assume that a master device transmits a poll frame (801) periodically, and a period of transmission time (804) between two consecutive poll frame is called "network period". The network Period (804) is started by transmitting the poll frame (801), and includes a command exchange period (CEP) (802) and a data exchange period (DEP) (803). In some networks, in order to acknowledge reception of a poll frame, a slave device may transmit a poll response frame (807) immediately after receiving the poll frame.

The CEP (802) is a period of time in which a device can transmit commands, data or acknowledgement frames using a contention-based access mechanism (e.g. CSMA/CA, Slotted ALOHA and so forth). FIG. 10 illustrates a command frame (805) and a acknowledgement frame (806).

The DEP (803) is a period of time reserved for non-contention access. The channel time in a DEP can be reserved for efficient data transmission without requiring contention prior to transmission.

The invention is not limited to the above-described order of a CEP and a DEP. Other orders of a period of time with similar functionality to those of a CEP and a DEP may alternatively be used.

Assume that there are five types of transmission frames, that is, a poll frame, a command frame, a data frame, an acknowledgement frame and a poll response frame.

Figure 11:
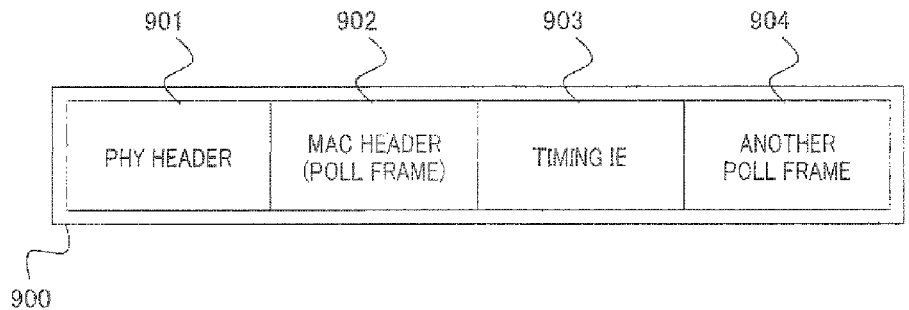
FIG. 11 is a drawing showing a frame format of a poll frame.

FIG. 11 shows the frame format of a poll frame (900). Generally, the poll frame (900) is composed of at least a physical layer (PHY) header (901), a medium access control (MAC) header (902), a timing information element (IE) (903), and the other poll frame information (904). The timing IE (903) contains information required for time synchronization, that is, contains timing information needed to allow the receiving device to determine the timing structure in the network period. Information contained is the length of a network period, the length of a CEP, the start time of the next CEP. In addition to time synchronization, a timing IE also contains network identification information for unique identification of the network (e.g. the network ID, or master device MAC address).

Figure 12:
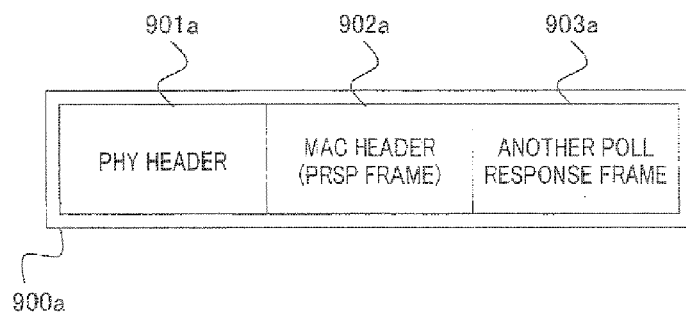
FIG. 12 is a drawing showing a frame format of a poll response frame.

FIG. 12 shows the frame format of a poll response frame (900*a*). Generally, the poll response frame (900*a*) is composed of at least a physical layer (PHY) header (901*a*), a medium access control (MAC) header (902*a*), and the other poll response frame information (904*a*).

Figure 13:
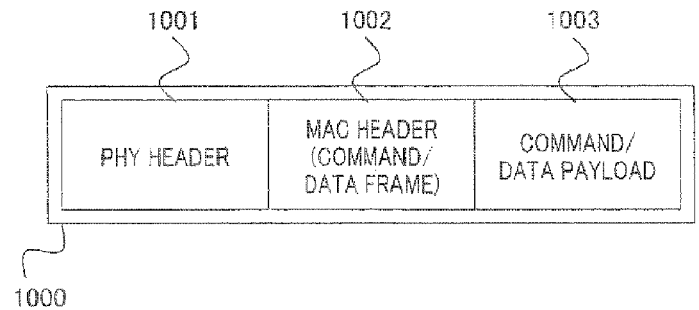
FIG. 13 is a drawing showing a frame format of a command or data frame.

FIG. 13 shows the frame format of a command or data frame. Generally, a command frame and a data frame have a very similar format (1000), and each is composed of at least a physical layer (PHY) header (1001), a medium access control (MAC) header (1002) and a command or data payload (1003).

Figure 14:
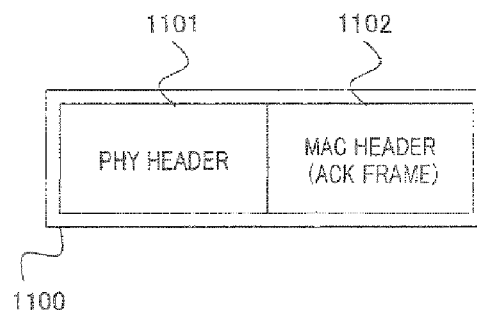
FIG. 14 is a drawing showing a frame format of an acknowledgement frame.

FIG. 14 shows the frame format of an acknowledgement frame (1100). Generally, the acknowledgement frame (1100) is composed of only a physical layer (PHY) header (1101) and a medium access control (MAC) header (1102).

In order to allow a second master device to communicate with a slave device that belongs to another network formed by the first master device, the frame formats of command, data, acknowledgement and poll response frames transmitted from the slave device are modified.

Figure 15:
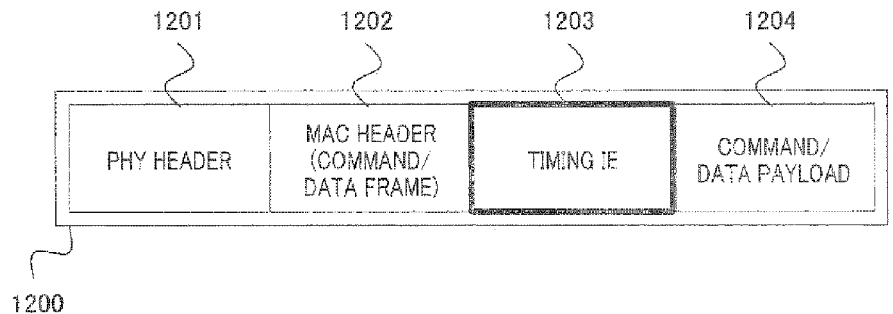
FIG. 15 is a drawing showing a frame format of a command or data frame including a timing IE for a slave device.

FIG. 15 shows the modified frame format of a command or data frame for slave devices. A new frame format (1200) is composed of at least a physical layer (PHY) header (1201), a medium access control (MAC) header (1202), a timing IE (1203), and a command or data payload (1204). Information in the timing IE is determined by calculations based on the timing IE received by this slave device in the poll frame last received from its master device.

Figure 16:
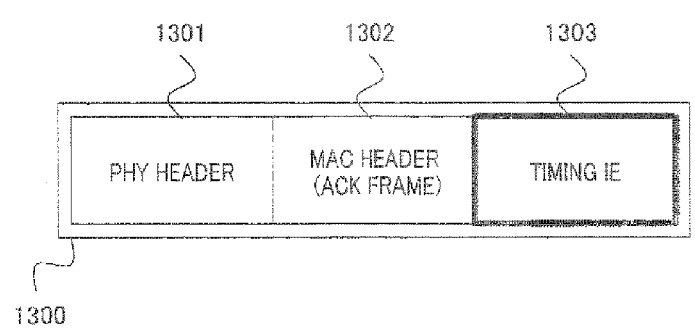
FIG. 16 is a drawing showing a frame format of an acknowledgement frame including a timing IE for a slave device.

FIG. 16 shows the modified frame format of an acknowledgement frame for slave devices. A new frame format (1300) is composed of a physical layer (PHY) header (1301), a medium access control (MAC) header (1302) and a timing IE (1303). Information within the timing IE is determined by calculations based on the timing IE received by this slave device in the poll frame last received from its master device.

Figure 17:
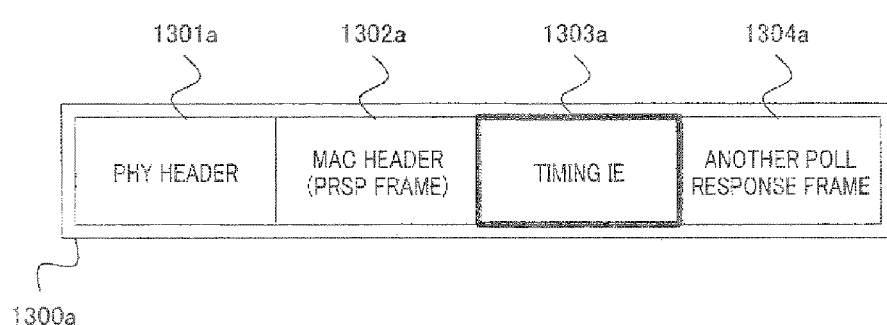
FIG. 17 is a drawing showing a frame format of a poll response frame for a slave device.

FIG. 17 shows a modified frame format of a poll response frame for slave devices. A new frame format (1300*a*) is composed of a physical layer (PHY) header (1301*a*), a medium access control (MAC) header (1302*a*), a timing IE (1303*a*) and the other poll response frame information (1304*a*). Information in the timing IE is determined by calculations based on the timing IE received by this slave device in the poll frame last received from its master device.

In order to make request from a second master device to the first master device or a slave device in the network to which the first master device belongs, to vacate the current channel, a "channel vacation request command" is defined.

Figure 18:
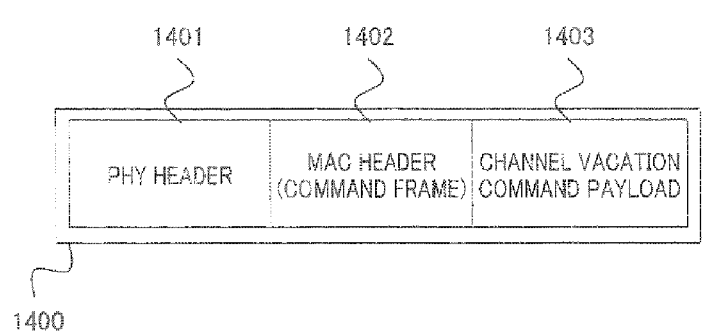
FIG. 18 is a drawing showing a frame format of a channel vacation request command frame.

FIG. 18 shows an example of a frame format (1400) of a channel vacation request command frame. The frame format (1400) is composed of a physical layer (PHY) header (1401), a media access control (MAC) header (1402) and information such as network identification information of the network to which a target device belongs, and, if necessary, a channel vacation command payload (1403) including the reason for channel vacation. Note that, alternatively, an existing frame format or an existing command frame for poll (or "beacon") can be used by embedding information indicating the intent of "channel vacation request".

Next, in order to allow the first master device receiving a channel vacation request from a second master device to give notice to slave devices connecting to the first master device to terminate the network and stop all transmissions, "network termination command" is defined.

Figure 19:
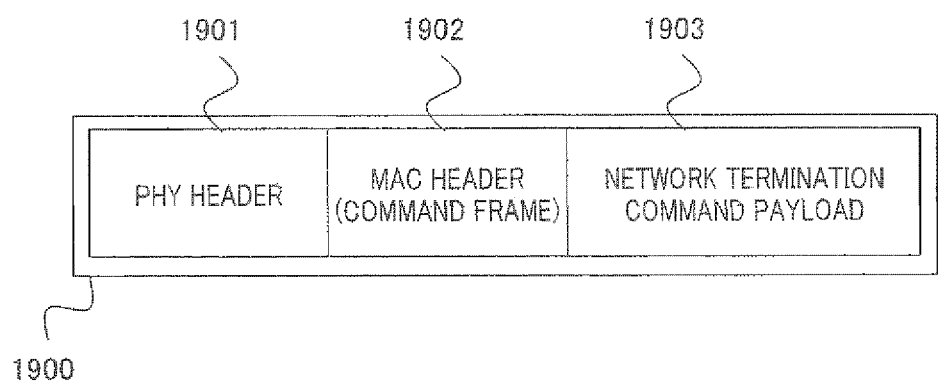
FIG. 19 is a drawing showing a frame format of a network termination command frame.

FIG. 19 shows a frame format (1900) of a network termination command. A frame format (1900) is composed of a physical layer (PHY) header (1901), a medium access control (MAC) header (1902), and a network termination command payload (1903) which may include information such as the reason for network termination (for example, channel vacation by another device). Note that, alternatively, an existing frame format or an existing command frame for poll (or "beacon") can be used by embedding information indicating the intent to inform "network termination".

To enable communication between a slave device and a master device in another network, the slave device first determines its own timing IE, based on the timing IE received from the master device to which the slave device is connected in the poll frame last received. The timing IE of a slave device is composed of the following elements:

Network identification information - - - this is information uniquely identifies the current network and is equivalent to the timing IE in the poll frame last received from the mater device; and Timing synchronization information - - - this information contains network timing information relative to the time to transmit this frame. Therefore, the timing synchronization information should be calculated based on the timing information in the timing IE of the poll frame last received from the master device, and adjusted such that the timing information is now relative to the time to transmit the frame from the slave device but not the time to last receive the poll frame.

The slave device embeds the synchronization information in the frame format (as shown in FIG. 15 and FIG. 16) after timing IE determination and before frame transmission.

Figure 20:
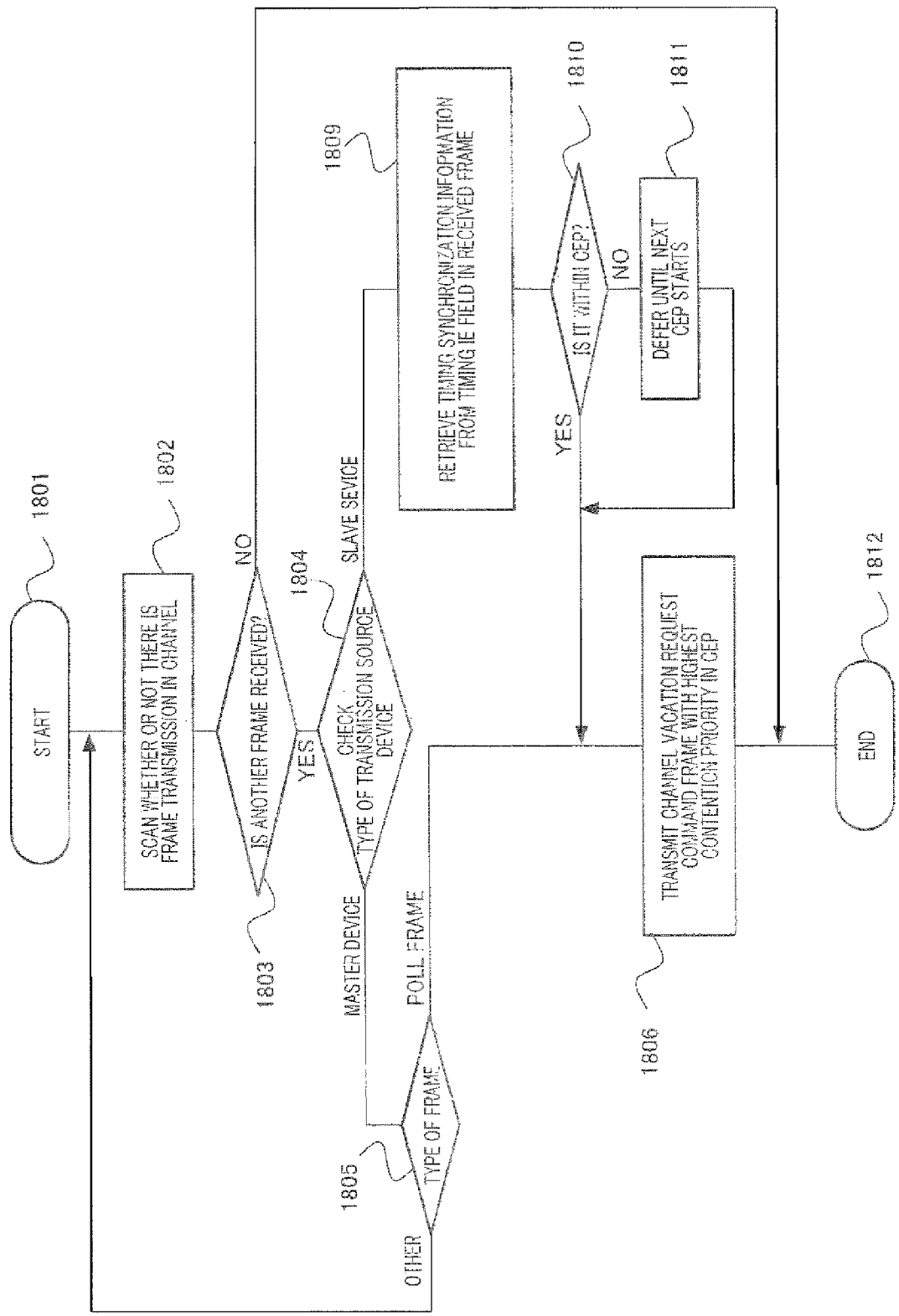
FIG. 20 is a flowchart showing steps of channel vacation request.

Next, steps of detecting existing devices in the channel and vacating the channel will be explained with reference to FIG. 20.

After power-on, a device enters a channel vacation request starting step (1801) when being subjected to a certain level of interference.

After the channel vacation request starting step (1801), the device performs scanning (1802) for any frame transmission in the channel in order to detect the presence or absence of an existing device. If there is no frame transmission received (1803: No), the steps for channel vacation request terminate (1812).

On the other hand, if a frame is received (1803: Yes), the device checks the type of the device having transmitted the received frame (1804). If the device having transmitted the received frame is a master device, the device checks the frame type of the received frame (1805).

If the frame type is not a poll frame, the device returns to channel scanning operation (1802). On the other hand, if the frame type is a poll frame, the device transmits a channel vacation request command frame with the highest contention priority, in a CEP (1806).

"The highest contention priority" depends on implementation. For example, if the contention mechanism used in a CEP is CSMA/CA using random back-off selected from an integer window of "1" to "7", "the highest contention priority" means application of a random back-off value of "1", which uses the minimum back-off waiting. A channel vacation request command frame is transmitted as a broadcast frame. Here, a case may be possible where the receiving side device can transmit the above-described frame to request to return an acknowledgement frame if necessary, as a unicast frame.

The device can know when the CEP starts and terminates because of being possible to read the timing IE in the received poll frame. After transmitting a channel vacation request command, the device terminates the steps for channel vacation request (1812).

On the other hand, in a case in which an acknowledgement frame is received (1807: No), if there is the remaining time for retransmission in the CEP (1808: No), the device returns to channel vacation request command retransmission operation in the CEP (1806), or, if there is no remaining time for retransmission in the CEP (1808: Yes), returns to the channel time scanning operation (1802) for frame transmission.

Figure 21:
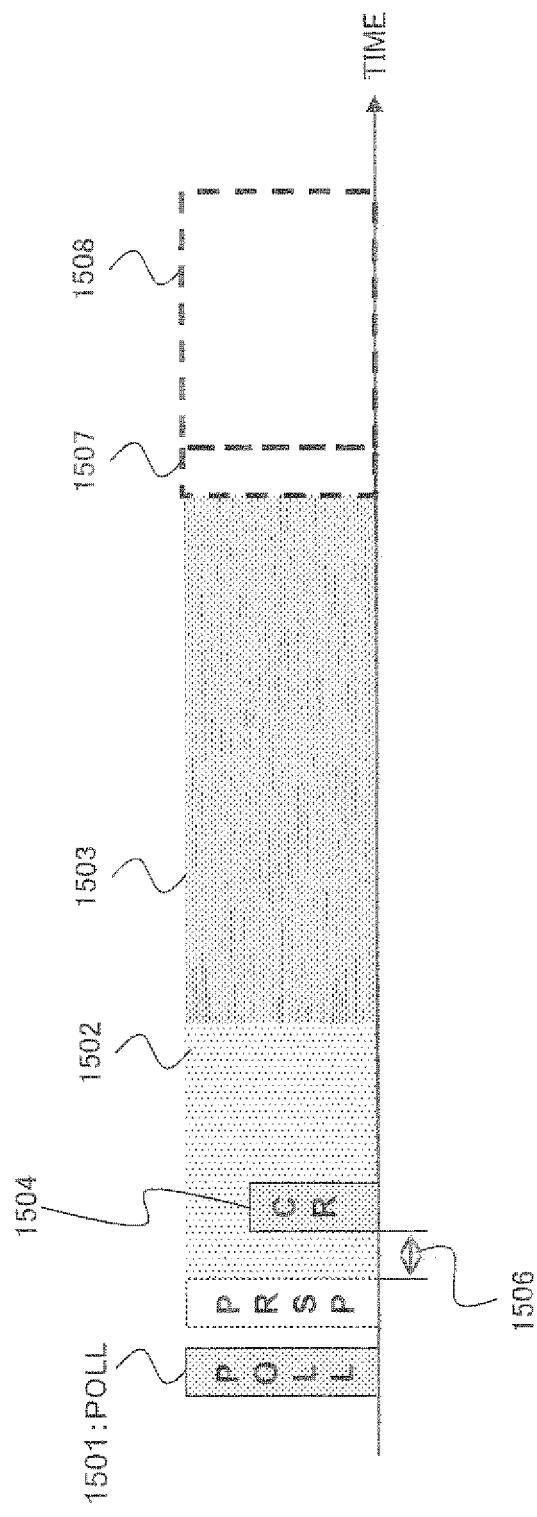
FIG. 21 is a drawing showing a network period in which a channel vacation request command is transmitted after poll frame reception.

FIG. 21 illustrates the network period in which, when a poll frame (1501) transmitted from a master device is received during the scanning operation (1802), a channel vacation request command frame (1504) is transmitted with the highest priority during a CEP (1502).

If the above-described frame is received from a slave device instead of from a master device after channel scanning operation, the device retrieves timing synchronization from the timing IE field of the received frame (1809). This is possible because a timing IE is embedded in each of all frames transmitted from slave devices. After retrieving the timing synchronization from the timing IE field of the received frame (1809), the device is able to determine the timing in the network period of the transmission source slave device, and therefore able to determine whether or not the current timing is the CEP (1810).

If it is determined that currently the slave device is not in the CEP (1810: No), the device defers its channel vacation request command transmission until the next CEP starts (1811).

The device is able to calculate when the next CEP starts based on the retrieved timing synchronization information. Once it is determined that the slave device is in the CEP (1810: Yes), the device broadcasts a channel vacation request command frame with the highest contention priority in the CEP (1806), and terminates the steps for channel vacation request (1812).

In a case in which an acknowledgement frame is not received (1807: No), if there is remaining time for retransmission in the CEP (1808: No), the device returns to channel vacation request command retransmission operation in the CEP (1806), or, if there is no remaining time for retransmission in the CEP (1808: Yes), returns to channel time scanning operation (1802) for frame transmission.

Figure 22:
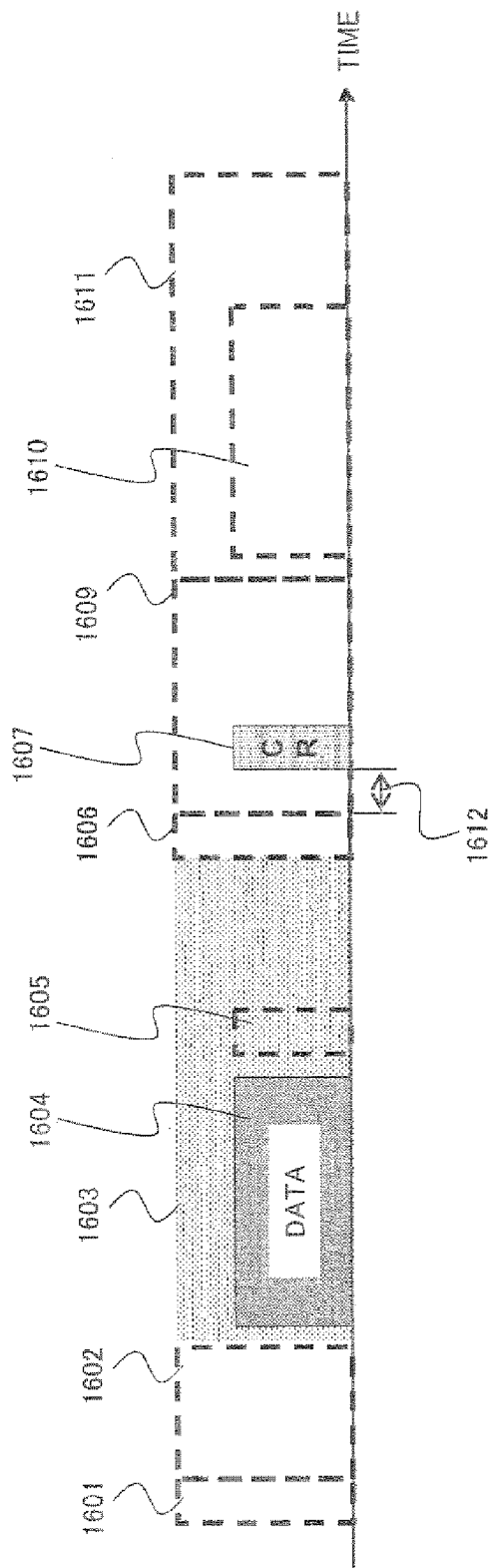
FIG. 22 is a drawing showing a network period in which a channel vacation request command is transmitted after a data frame from a slave device is received.

FIG. 22 illustrates the network period when a data frame (1604) transmitted froze a slave device during a DEP (1603) is received by a device performing the channel scan (1802). A received data frame (1604) contains a timing IE, and, by timing synchronization information in the timing IE, the device having received the data frame is able to determine the timing structure of the network period (that is, the next start time the master device of this network transmits a poll frame (1606), and the start and end of each of the next CEP (1609) and DEP (1611).)

Therefore, the device is able to determine that currently it is in the DEP (1603), and therefore defers transmission (1811) of a channel vacation request command (1607) to the next CEP (1609).

Figure 23:
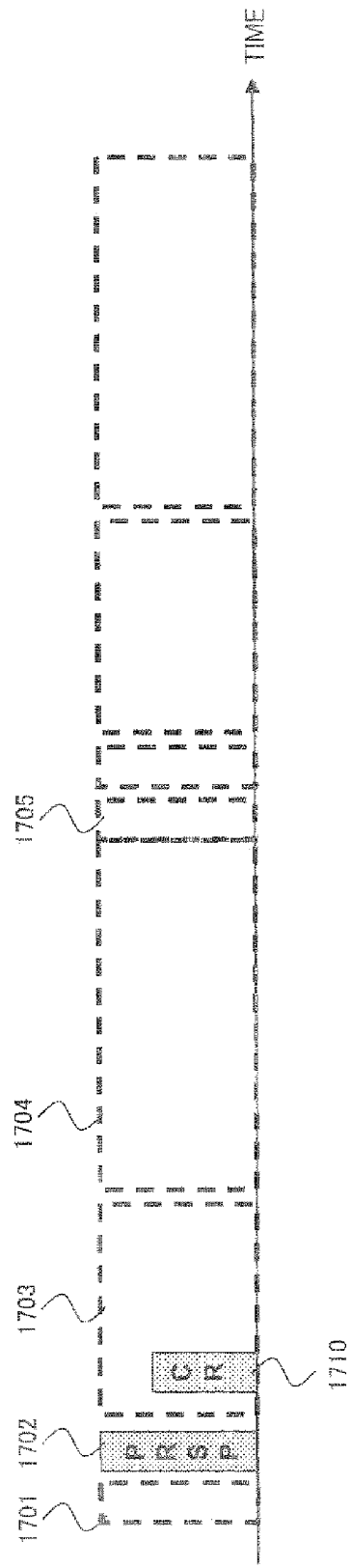
FIG. 23 is a drawing showing a network period in which a channel vacation request command is transmitted after an acknowledgement frame from a slave device is received.

FIG. 23 illustrates the network period when a poll response frame (1702) transmitted from the slave device having received a poll frame is received by the device performing the channel scan (1802).

The received poll response frame (1702) contains a timing IE, and, by timing synchronization information in the timing IE, the device having received the poll response frame is able to determine the timing structure of the network period (that is, the next start time the master device of this network transmits a poll frame (1705), and the start and end of each of the next CEP (1703) and DEP (1704).)

Therefore, the device is able to determine that currently it is in the DEP (1703), and therefore is able to start broadcasting a channel vacation request command (1710) in the current CEP (1703).

Next, response to a received channel vacation request command frame will be described.

Figure 24:
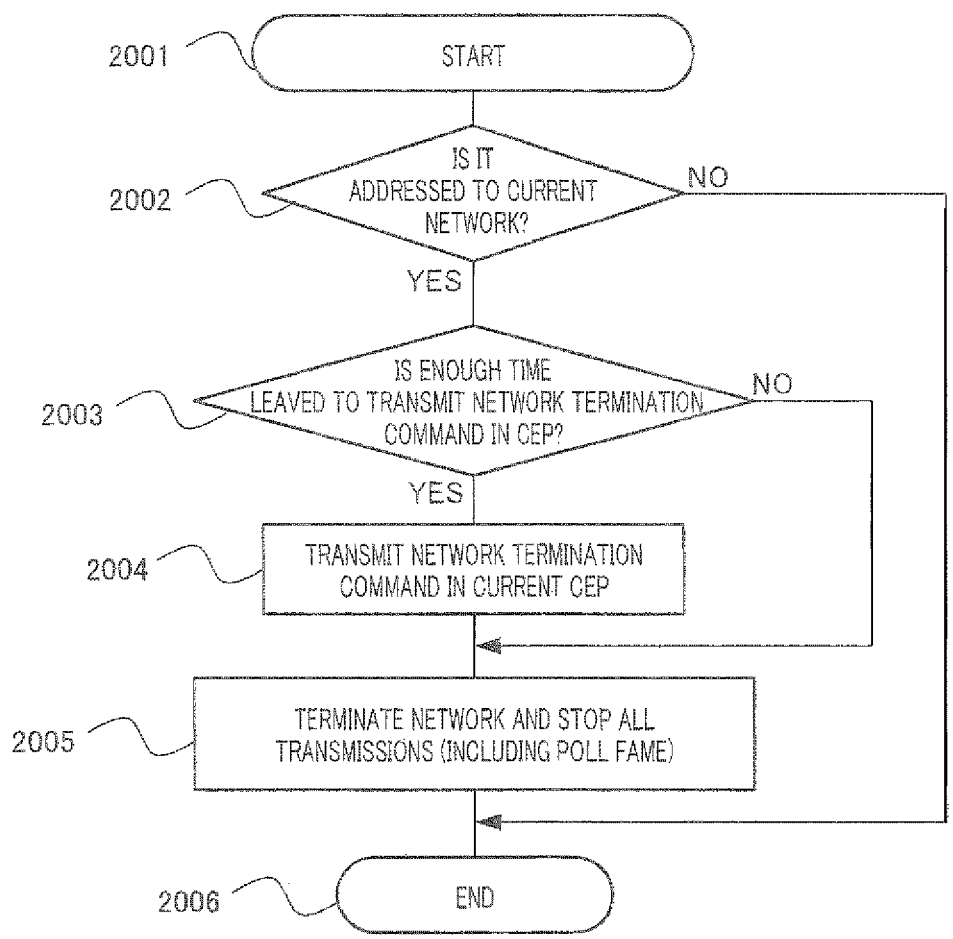
FIG. 24 is a flowchart showing steps of channel vacation response in a master device.

FIG. 24 is a flowchart showing steps of response to a received channel vacation request command frame in a master device. After receiving a channel vacation request command frame in the CEP, a master device enters a channel vacation response starting step (2001) and determines whether or not the received channel vacation command request frame is addressed to the current network that belongs to the master device (2002).

If the channel vacation request command frame is not addressed to its network (2002: No), the master device ends the steps for channel vacation response (2006). If the channel vacation request command frame is addressed to its network (2002: Yes), the master device determines whether or not enough time is left to transmit a network termination command frame in the current CEP (2003).

If time is left (2003: Yes), another device requests to vacate the current channel, so that the master device transmits a network termination command frame (2004) in order to give notice to all slave devices in this network to terminate the network. Regardless whether or not a network termination command frame is transmitted, the master device terminates the network and stops all transmissions in the current channel (2005). After that, the master device ends the steps for channel vacation response (2006).

As described above, according to the present embodiment, a channel vacation command frame with the highest contention priority is transmitted in the CEP in a case where a device detects a frame transmitted from another device in another network, the device having transmitted the detected frame is a master device, and the detected frame is a poll frame. On the other hand, when the device having transmitted the detected frame is a slave device, timing synchronization information is retrieved from the timing IE of the detected frame, and a channel vacation request command frame with the highest contention priority is transmitted in a CEP.

By this means, the master device with a higher priority is able to vacate the channel for another device in another network in a centralized network, so that it is possible to efficiently use channel time.

According to Embodiment 1 of the present invention, the method to allow the first device to communicate with any second device from another network allows all devices which can exist in the channel in operation to use network timing information of the network to which the second device belongs. In a centralized network, typically, only the master device periodically transmits network timing information. Slave devices do not periodically transmit this information taking into account power consumption. According to the present invention, network timing information is embedded in all frames which can be transmitted from slave devices. By this means, the first device only being able to listen for a slave device is able to identify network timing information of the slave device, and therefore is able to communicate with the slave device.

According to Embodiment 2 of the present invention, after retrieving network timing information of a second device, the first device transmits a frame to give notice to one or more devices in this network to stop all transmissions in the current radio channel, and therefore makes existing devices operating on this radio channel vacate the radio channel. The devices having received the above-described frame stop all transmissions, so that the first device can successfully command, from a certain network, one or more devices to vacate the radio channel.

According to Embodiment 3 of the present invention, after receiving a frame from the first device requesting to vacate the currently operating channel, a second device transmits another frame to give notice to all devices in this network to vacate the currently operating channel if necessary, before stopping all transmissions. By this means, other devices which can not listen for the first device is able to know channel vacation request from the first device.

The disclosure of Japanese Patent Application No. 2008-136910, filed on May 26, 2008, including the specification, drawings and abstract, is incorporated herein by reference in its entirety.

INDUSTRIAL APPLICABILITY

A method and a radio communication system for channel vacation used in radio communication devices according to the present invention are applicable to, for example, a mobile communication system and so forth.

The invention claimed is:

1. A method for channel vacation used in radio communication devices, the method comprising:
   receiving, by a first radio communication device serving as a non-control device in a first network, timing synchronization information of the first network transmitted by a second radio communication device serving as a control device in the first network;
   embedding, by said first radio communication device, said timing synchronization information of the first network into non-management frames;
   identifying, by a third radio communication device serving as either non-control device or control device in a second network, through receiving said first network's time synchronization information embedded into non-management frames transmitted by said first radio communication device, period (Command Exchange Period) of time within the said first network in which a command frame is allowed to be transmitted;
   giving notice, from said third radio communication device to said first radio communication device, second radio communication device and all other devices in said first network, through transmitting a broadcast channel vacation request frame in said Command Exchange Period, to vacate a current radio channel; and
   stopping, by said first radio communication device, said second radio communication device or any communication device in said first network, all transmissions in said current radio channel, upon receiving said channel vacation request frame transmitted by said third radio communication device.

2. A radio communication system comprising:
   a first radio communication device that is a non-control device in a first network, embeds timing synchronization information into non-management frames, and stops all transmission in the current channel upon receiving a channel vacation request frame from any device in any other network different from the first network;
   a second radio communication device that is a control device in said first network, transmits the timing synchronization information of said first network to said first radio communication device, and stops all transmission in the current channel upon receiving the channel vacation request frame from any device in any other network different from the first network; and
   in a second network different from the first network, a third radio communication device identifies the first network and its Command Exchange Period in which a command frame is allowed to be transmitted, through reception of the timing synchronization information embedded in the non-management frames transmitted by said first radio communication device, and gives notice to the first radio communication device and the second radio communication device in the first network to vacate a current radio channel, through broadcasting the channel vacation request frame in the Command Exchange Period of said first network using the highest contention priority.

3. The method according to claim 1, further comprising:
   when the first radio communication device receives a channel vacation request frame, addressing the second communication device in the first network and transmitting a network termination command to stop all transmissions in a current channel in operation.

4. The method according to claim 3, further comprising:
   when the second radio communication device receives the network termination command, stopping all transmissions in the current channel in operation.

5. The method according to claim 1, wherein said Command Exchange Period has the highest contention priority.

* * * * *